United States Patent [19]

Udipi

[11] 4,308,364

[45] Dec. 29, 1981

[54] LACTONES FROM GAMMA-HYDROXY ACIDS AS COUPLING AGENTS

[75] Inventor: Kishore Udipi, East Longmeadow, Mass.

[73] Assignee: Phillips Petroleum Company, Bartlesville, Okla.

[21] Appl. No.: 199,763

[22] Filed: Oct. 23, 1980

[51] Int. Cl.$^3$ .............................................. C08F 8/16
[52] U.S. Cl. ..................... 525/359.2; 525/284; 525/314; 525/386; 526/181
[58] Field of Search ............... 525/386, 314, 359, 284; 526/181

[56] References Cited

U.S. PATENT DOCUMENTS

| | | | |
|---|---|---|---|
| 3,627,745 | 12/1971 | Hsieh et al. | 526/181 |
| 3,639,519 | 2/1972 | Hsieh et al. | 525/386 |
| 3,654,212 | 4/1972 | Wright | 525/386 |
| 3,764,639 | 10/1973 | Hsieh et al. | 525/314 |
| 3,773,732 | 11/1973 | Dillenschneider | 526/181 |
| 3,880,955 | 4/1975 | Hsieh et al. | 525/386 |
| 4,174,360 | 11/1979 | Moczygemba | 525/386 |

OTHER PUBLICATIONS

Polymerization of Cyclic Esters; Hall et al., Journ. Am. Chem. Soc., vol.. 80, Dec. 17, 1958, pp. 6409–6412.

*Primary Examiner*—William F. Hamrock

[57] ABSTRACT

Lactones derived from gamma-hydroxy acids are employed as coupling agents for polymers derived from alkali metal-initiated polymerizations. These coupling agents provide effective coupling without formation of undesirable by-products.

9 Claims, No Drawings

LACTONES FROM GAMMA-HYDROXY ACIDS AS COUPLING AGENTS

FIELD OF THE INVENTION

The invention pertains to the termination of alkali metal initiated polymerizations. In another aspect, it relates to the coupling of alkali metal terminated polymer molecules.

BACKGROUND OF THE INVENTION

The polymerization of conjugated dienes and monovinylarenes under solution conditions with a hydrocarbyl alkali metal compound is known. The use as coupling agents of esters, such as those prepared by the reaction of a carboxylic acid with a hydrocarbyl alcohol, has been a useful procedure to provide a coupled product of improved properties. However, one of the shortcomings of using such esters as coupling agents is that an organic by-product forms, i.e. an alcohol, as a result of the coupling reaction. This by-product often is troublesome if the polymerization diluent is to be recycled, and it furthermore contributes to unfavorable economics of the overall process.

U.S. Pat. No. 3,627,745 discloses the termination of alkali metal initiated diene polymerizations with certain lactones to increase polymer Mooney viscosity, decrease polymer coldflow, increase green tensile strength, and the like. However, U.S. Pat. No. 3,627,745 plainly excludes the use of those lactones derived from gamma-hydroxy acids in the formula shown at col. 1 line 2 in which n=2. 80 J.A.C.S. 6409 (1958) discloses that butyrolactone and other lactones from gamma-hydroxy acids (in the formula shown in U.S. Pat. No. 3,627,745 those in which n would equal 2) do not polymerize due to thermodynamic reasons. Thus, according to the published literature, gamma-hydroxy acid-derived lactones are not useful as polymer terminating agents.

BRIEF DESCRIPTION OF THE INVENTION

Unexpectedly, however, I have discovered that lactones derived from gamma-hydroxy acids are highly effective coupling agents for polymeralkali metal. The lactones from gamma-hydroxy acids are very attractive as coupling agents since their use in coupling involves a ring opening reaction that does not generate by-products and does provide high coupling efficiency. Further, the very desirable storage stability of these lactones tends to help assure ultimate coupled product uniformity.

DETAILED DESCRIPTION OF THE INVENTION

Lactones From Gamma-Hydroxy Acids

The lactones which have surprisingly been found to be efficient coupling agents according to this invention are γ-lactones of the general structure

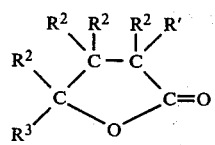

wherein $R'$ is hydrogen, halogen, alkyl, cycloalkyl, alkenyl, cycloalkenyl, aryl, and combinations thereof wherein the halogen is chlorine or bromine;

$R^2$s are the same or different and can be hydrogen, alkyl, cycloalkyl, alkenyl, cycloalkenyl, and aryl, and combinations thereof;

$R^3$ is the same as $R^2$ or a radical of the structure

with the stipulation that when $R^3$ is the radical

no $R^2$ is attached to the carbon atom to which the specified radical is attached.

Typically, the total carbon atoms in each of the $R'$, $R^2$, and $R^3$ substituents when they are hydrocarbyl in nature is in the range of about 1 to about 12.

Non-limiting examples of suitable γ-lactones include γ-butyrolactone, α-bromo-γ-butyrolactone, α-chloro-γ-valerolactone, γ-valerolactone, γ(n-pentyl)-γ-butyrolactone, γ-(n-octyl)-γ-butyrolactone, γ-methyl-γ-valerolactone, γ-phenyl-γ-valerolactone, γ-caprolactone, β-ethyl-γ-caprolactone, α-methyl-γ-butyrolactone, α-ethyl-γ-valerolactone, γ-isopropylidene-γ-butyrolactone, and the like. Mixture of γ-lactones can also be employed.

Any desired effective coupling amount of the γ-lactone can be employed. The amount is not critical. At least a stoichiometric amount relative to the active polymer-alkali metal tends to promote maximum coupling. Less can be used for lesser degrees of coupling where desired. Adding small less-than-stoichiometric amounts during polymerization tends to promote the formation of coupled species of various molecular weights, sometimes desired for improved processability of polymers of conjugated dienes.

Typically, the amount of γ-lactone coupling agent added broadly usually will be in the range of about 0.03 to 20 mhm (gram millimoles per 100 grams of total monomers), presently preferably about 0.5 to 5 mhm. The effectiveness of γ-lactones as coupling agents is not significantly altered by or dependent upon a stoichiometric relationship to the concentration of polymer-alkali metal bonds, which simplifies their employment.

Polymerization Process

In general, my invention is applicable to processes for the polymerization of conjugated dienes, or monovinylarenes, or both, in the presence of a diluent employing an alkali metal-based initiator.

The conjugated dienes ordinarily contain 4 to 12 carbon atoms per molecule, and those containing from 4 to 8 carbon atoms are preferred for availability. Such monomers include 1,3-butadiene, isoprene, 2,3-dimethyl-1,3-butadiene, piperylene, 3-butyl-1,3-octadiene, 2-phenyl-1,3-butadiene, and the like. The monovinylarenes ordinarily contain 8 to 20, more conveniently 8 to 12, carbon atoms per molecule, including such as styrene, α-methylstyrene, 1-vinylnaphthalene, 2-vinylnaphthalene, and the alkyl, cycloalkyl, aryl, alkaryl, and aralkyl derivatives thereof in which the total number of carbon atoms in the combined substituents generally is not greater than 12. Examples substituted monomers include 3-methylstyrene, 4-n-propylstyrene, 4-cyclohexylstyrene, 4-dodecylstyrene, 3-ethyl-4-benzylstyrene, 4-p-tolylstyrene, 4-(4-phenyl-n-butyl)styrene, and the like. Any of the conjugated dienes and/or the monovinylarenes can be polymerized alone, or in admixture, or sequentially, to form homopolymers or random or block copolymers. The weight ratio of conjugated diene:monovinylarene monomers in copolymerizations can range from about 95:5 to 1:99.

The solution process polymerization as is known in the art usually is carried out at a temperature in the range between about −100° to 150° C., more usually about 0° to 110° C., and at a pressure sufficient to maintain the reaction mixture substantially as a liquid, in the presence of a diluent. Suitable diluents include, for example, paraffins, cycloparaffins, and aromatic hydrocarbons, of such as 4 to 10 carbon atoms per molecule. Examples include pentane, hexane, cyclopentane, cyclohexane, isooctane, benzene, toluene, and mixtures. As is known, small amounts of polar compounds can be included in the diluent for vinyl control in diene polymers, or to improve effectiveness of some initiators for monovinylarene polymerizations, and the like.

The initiators can be any of the alkali metals or organoalkali metal compounds known for such purposes. Preferably, the organoalkali metal compounds correspond to the general formula $RM_x$, in which R is a hydrocarbyl aliphatic, cycloaliphatic, or aromatic radicals, and x is an integer of 1 to 4 inclusive, and M is an alkali metal, preferably lithium. The amount of alkali metal-based initiator employed depends upon the desired polymer molecular weight, and can range from about 0.1 to 40 gram milliequivalents per 100 grams of monomers. The polymerization is conducted in the substantial absence of air or moisture, preferably in an inert atmosphere. The resulting polymers contain a very high percentage of molecules in which an alkali metal atom is positioned at the end or ends of the polymer chains, although any traces of impurities present, such as water or alcohol, tend to reduce the amount of alkali metal-terminated polymer formed.

Monomers preferred for the practice of this invention are butadiene, isoprene, and styrene due to their availability and relatively low cost. This invention is particularly applicable to polybutadiene and butadiene-styrene random or block copolymers prepared in the presence of a butyllithium initiator to produce a lithium-terminated polymer.

The use of γ-lactones as coupling agents presently is especially suitable in the preparation of butadiene-styrene, polymodal, resinous, block copolymers containing about 70 to 95 weight percent of styrene.

Coupling Reaction

The γ-lactone coupling agent can be introduced into the polymerization reaction mixture in any suitable and convenient manner. It can be added to the polymerization mixture at any time during or after the polymerization reaction. It can be added in small quantities either intermittently or continuously during the course of the reaction. Typically it is added following completion of the monomer polymerization. For effective coupling, the γ-lactone must be added before any material such as water, acid, alcohol, antioxidant, or carbon dioxide is added to inactivate and/or remove the lithium atoms attached to the terminal monomer unit of the polymer chain. The temperature suitable for conducting the coupling reaction, i.e. reaction of polymer lithium with γ-lactone, can vary over a broad range and conveniently is the same temperature used for the polymerization of the monomers. The time for conducting the coupling reaction can be up to 24 hours, preferably about 10 seconds to 10 minutes. The pressure employed for the coupling reaction can be below or above atmospheric and preferably and conveniently is the autogenous pressure.

Polymer Recovery

Following completion of the coupling reaction, the coupled polymer, which still contains bound lithium atoms in the form of O—Li bonds, is treated to remove the lithium from the polymer. Suitable treating agents include lower alcohols, mineral acids, water, antioxidant, and carbon dioxide, alone or in combination. The now lithium-free polymer can be isolated by typical procedures, such as solvent flashing, coagulation using a non-solvent for the polymer such as isopropyl alcohol, or steam stripping.

Polymers produced by the process of this invention are suitable for preparing hoses, V-belts, tires, gaskets, shoe soles, wire coating, film, containers, tubes, and many other articles.

EXAMPLES

Examples following are intended to further illustrate my invention. However, particular materials employed, monomers, relationships, reaction conditions, species, and the like, should be considered exemplary, and not limitative of the reasonable scope of my invention as herein disclosed and claimed.

EXAMPLE I

These runs illustrate the use of γ-butyrolactone, a lactone from a gamma-hydroxy acid, as a coupling agent for conjugated diene/monovinylarene copolymer. The copolymer prepared was a 24/76 butadiene/styrene block copolymer.

Polymerization and coupling were conducted in a 3 liter capacity, jacketed, stainless steel, stirred reactor. Ingredients were charged and the polymerizations conducted at the conditions stipulated in Recipe I:

| Recipe I | | | |
|---|---|---|---|
| Step 1 | | | |
| Cyclohexane, parts by weight | 173 | | |
| Tetrahydrofuran, parts by weight | 0.024 | | |
| Styrene, parts by weight | 38 | | |
| n-Butyllithium, mhm[a] | 2.51 | | |
| Polymerization temperature, °C. | 42 | → | 80[b] |
| Polymerization time, minutes | 19 | | |
| Pressure, kPa (gauge) | 138 | → | 234[c] |
| Step 2 | | | |
| Styrene, parts by weight | 38 | | |
| Cyclohexane, parts by weight | 22 | | |
| Polymerization temperature, °C. | 78 | → | 86[b] |
| Polymerization time, minutes | 15 | | |
| Pressure, kPa (gauge) | 234 | | |
| Step 3 | | | |
| 1,3-Butadiene, parts by weight | 24 | | |
| Cyclohexane, parts by weight | 22 | | |
| Polymerization temperature, °C. | 66 | → | 102[b] |
| Polymerization time, minutes | 23 | | |
| Pressure, kPa (gauge) | 207 | → | 345[c] |
| Step 4 | | | |

-continued

| Recipe I | |
|---|---|
| γ-Butyrolactone, mhm[a] | 1.75 |
| Cyclohexane, parts by weight | 22 |
| Reaction temperature, °C. | 100 |
| Reaction time, minutes | 6 |
| Pressure, kPa (gauge) | 207 |

[a]mhm = Gram millimoles per 100 grams of total monomers.
[b]Polymerization began at lower temperature and peaked at upper temperature.
[c]Polymerization began at lower pressure and peaked at upper pressure.

Following completion of Step 4, the polymerization solution was treated with 4 parts by weight of a 50:50 by volume toluene:isopropyl alcohol solution containing 2.5 weight percent of 2,6-di-t-butyl-4-methylphenol (BHT) and 7.5 weight percent of tris(nonylphenyl) phosphite (TNPP). This treatment, which effectively replaced the lithium on the polymer with hydrogen, was followed by coagulation of the polymer using excess isopropyl alcohol, recovery of the polymer by filtration, and drying of the recovered polymer at 60° C. for 15 hours under reduced pressure.

A non-coupled control polymer was isolated by isopropyl alcohol coagulation of a sample of the polymerization reaction mixture following Step 3 without adding the γ-butyrolactone coupling agent in Step 4.

Properties of the coupled, and of the non-coupled precursor, polymers are shown in Table I:

TABLE I

Properties of Butadiene-Styrene
Block Copolymer Coupled With γ-Butyrolactone

| Sample | Molecular Wt.[a] | | Hetero-geneity Index[b] | Inherent Viscosity[c] | Gel, Wt. %[d] | Coupling Efficiency, %[e] |
|---|---|---|---|---|---|---|
| | $M_w$ | $M_n$ | | | | |
| Non-coupled[f] | 39,000 | 35,000 | 1.11 | 0.34 | 0 | — |
| Coupled | 81,000 | 60,000 | 1.35 | 0.53 | 0 | 89 |

[a]Molecular weights were determined from gel permeation chromatography curves by a procedure described by G. Kraus and C. J. Stacy, J. Poly. Sci. A-2 10, 657 (1972), and G. Kraus and C. J. Stacy, J. Poly. Sci. Symposium No. 43, 329 (1973).
[b]Heterogeneity index = $M_w/M_n$. The higher the heterogeneity index, the broader the molecular weight distribution.
[c]Inherent viscosity was determined according to a procedure given in U.S. Pat. No. 3,278,508, column 20, Note a with the modification that the solution was not filtered through a sulfur absorption tube but rather a sample of the solution was filtered through a fritted glass filter stick of grade C porosity and pressured directly into the viscometer.
[d]Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e. the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.
[e]Coupling efficiency is defined as the percentage of the living polymer molecules which are incorporated into the coupled polymer. It is calculated from the gel permeation chromatographic curve by dividing the area under the peak representing the coupled polymer by the areas under the peaks representing the coupled and uncoupled polymers and multiplying by 100.
[f]Sample of polymer recovered following Step 3 of Recipe I.

These data and the gel permeation chromatography curves of the coupled and the precursor polymers clearly demonstrated that the γ-butyrolactone effectively coupled the polymer-lithium.

EXAMPLE II

These runs illustrate the use of α-bromo-γ-butyrolactone, another lactone derived from a gamma-hydroxy acid, as a coupling agent for polymer-alkali metal.

Polymerization, coupling, and polymer recovery was conducted according to the recipe and procedure described in Example I with the exception that in Step 4 of the recipe, γ-butyrolactone was replaced with 0.58 mhm of α-bromo-γ-butyrolactone. Again, a 24/76 butadiene/styrene block copolymer was prepared, both coupled and uncoupled.

Properties of the coupled polymer and a non-coupled precursor polymer are shown in Table II.

TABLE II

Properties of Butadiene-Styrene Block Copolymer
Coupled with α-Bromo-γ-Butyrolactone

| Sample | Molecular Wt. | | Hetero-geneity Index | Inherent Viscosity | Gel, Wt. % | Coupling Efficiency, % |
|---|---|---|---|---|---|---|
| | $M_w$ | $M_n$ | | | | |
| Non-coupled | 30,000 | 35,000 | 1.11 | 0.34 | 0 | — |
| Coupled | 95,000 | 66,000 | 1.44 | 0.50 | 0 | 45 |

These data and the gel permeation chromatography curves of the coupled and the precursor polymers clearly demonstrated that the α-bromo-γ-butyrolactone effectively coupled the polymer lithium.

The disclosure, including data, illustrate the value and effectiveness of my invention. The Examples, the knowledge and background of the field of the invention, as well as the general principles of chemistry and other applicable sciences, have formed the bases to which the broad description of the invention including the range of conditions and generic groups of operate components have been developed, and further formed bases for my claims here appended.

I claim:

1. A process of coupling an alkali metal-terminated polymer derived from the solution polymerization of at least one conjugated diene, monovinylarene, or both, wherein the improvement comprises employing an effective amount of at least one lactone derived from an γ-hydroxy acid in coupling said alkali-metal terminated polymer.

2. The process according to claim 1 wherein said lactone is represented by

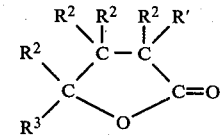

wherein R' is selected from the group consisting of hydrogen, halogen, alkyl, cycloalkyl, alkenyl, cycloalkenyl, aryl, wherein said halogen is chlorine or bromine; each $R^2$ is selected from the group consisting of R' other than halogen; $R^3$ is $R^2$ or a radical of the structure

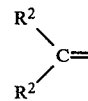

such that when $R^3$ is

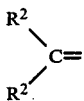

no $R^2$ is attached to the carbon atom to which said radical is attached.

3. The process according to claim 2 wherein the number of carbon atoms in the total R' plus $R^2$ plus $R^3$ is in the range of 1 to 12.

4. The process according to claim 3 wherein said lactone is selected from the group consisting of γ-butyrolactone, α-bromo-γ-butyrolactone, α-chloro-γ-valerolactone, γ-valerolactone, γ-(n-pentyl)-γ-butyrolacetone, γ-(n-octyl)-γ-butyrolactone, γ-methyl-γ-valerolactone, γ-phenyl-γ-valerolactone, γ-caprolactone, β-ethyl-γ-caprolacetone, α-methyl-γ-butyrolactone, β-ethyl-γ-valerolactone, γ-isopropylidene-γ-butyrolactone, and mixtures.

5. The process according to claim 3 wherein said effective amount of said lactone is in the range of about 0.03 to 20 mhm.

6. The process of claim 5 wherein said polymer is a conjugated diene homopolymer, conjugated diene copolymers, or a copolymers of at least one conjugated diene with at least one monovinylarene.

7. The process of claim 6 wherein said conjugated diene polymer is a butadiene/styrene copolymer.

8. The process of claim 7 wherein said lactone is γ-butyrolactone.

9. The process of claim 7 wherein said lactone is α-bromo-γ-butyrolactone.

* * * * *

Dedication 4,308,364.—*Kishore Udipi*, East Longmeadow, Mass. LACTONES FROM GAMMA-HYDROXY ACIDS AS COUPLING AGENTS. Patent dated Dec. 29, 1981. Dedication filed Aug. 9, 1982, by the assignee, *Phillips Petroleum Co.*

Hereby dedicates to the public the entire remaining term of said patent.

[*Official Gazette October 26, 1982.*]